US011891857B2

(12) United States Patent
Zhu et al.

(10) Patent No.: US 11,891,857 B2
(45) Date of Patent: Feb. 6, 2024

(54) ASSEMBLED LADDER

(71) Applicant: Jiangsu Zhou Jijie Intelligent Technology Co., Ltd, Suqian (CN)

(72) Inventors: Chen Hui Zhu, Suqian (CN); Baisong Yao, Suqian (CN)

(73) Assignee: JIANGSU ZHOU JIJIE INTELLIGENT TECHNOLOGY CO., LTD, Suqian (CN)

( * ) Notice: Subject to any disclaimer, the term of this patent is extended or adjusted under 35 U.S.C. 154(b) by 844 days.

(21) Appl. No.: 16/885,279

(22) Filed: May 28, 2020

(65) Prior Publication Data

US 2020/0378183 A1 Dec. 3, 2020

(30) Foreign Application Priority Data

May 29, 2019 (CN) ........................ 201910458609.6

(51) Int. Cl.

| | |
|---|---|
| ***E06C 1/20*** | (2006.01) |
| ***E06C 7/50*** | (2006.01) |
| ***E06C 7/42*** | (2006.01) |
| ***E06C 1/387*** | (2006.01) |
| ***E06C 7/08*** | (2006.01) |

(Continued)

(52) U.S. Cl.

CPC ................ *E06C 1/20* (2013.01); *E06C 1/387* (2013.01); *E06C 1/393* (2013.01); *E06C 7/08* (2013.01); *E06C 7/082* (2013.01); *E06C 7/083* (2013.01); *E06C 7/086* (2013.01); *E06C 7/42* (2013.01); *E06C 7/50* (2013.01); *E06C 7/48* (2013.01)

(58) Field of Classification Search

CPC . E06C 1/20; E06C 1/387; E06C 1/393; E06C 7/08; E06C 7/082; E06C 7/083; E06C 7/086; E06C 7/42; E06C 7/50; E06C 7/48; E06C 7/14; E06C 7/46; E06C 1/18; E06C 1/383

See application file for complete search history.

(56) References Cited

U.S. PATENT DOCUMENTS 3,112,811 A * 12/1963 Moran .................... E06C 7/165 182/120
10,151,144 B2 * 12/2018 Mora ...................... E06C 7/087

(Continued)

FOREIGN PATENT DOCUMENTS

KR 100786724 B1 * 12/2006 ............ E06C 1/383

*Primary Examiner* — Brian D Mattei
*Assistant Examiner* — Jacob G Sweeney
(74) *Attorney, Agent, or Firm* — Bayramoglu Law Offices LLC

(57) ABSTRACT

An assembled ladder includes two supporting leg assemblies, at least one rung and a bridging part, wherein each supporting leg assembly of the two supporting leg assemblies includes a front supporting leg and a rear supporting leg rotatably connected to the front supporting leg, and the at least one rung and the bridging part are detachably connected between the two supporting leg assemblies. During logistics transportation, the at least one rung is detached from the two supporting leg assemblies, the bridging part is also detached from the two supporting leg assemblies, and the two supporting leg assemblies are stacked. In use, two ends of the bridging part are fixedly connected to the two supporting leg assemblies, and two ends of the at least one rung are also fixedly connected to the two supporting leg assemblies.

14 Claims, 5 Drawing Sheets

(51) Int. Cl.
*E06C 1/393* (2006.01)
*E06C 7/48* (2006.01)

(56) References Cited

U.S. PATENT DOCUMENTS

| | | | | |
|---|---|---|---|---|
| 2004/0231920 | A1* | 11/2004 | Meeker | E06C 7/087 182/165 |
| 2011/0147123 | A1* | 6/2011 | Leng | E06C 1/393 182/194 |
| 2015/0308190 | A1* | 10/2015 | Skubic | E06C 1/393 182/124 |

* cited by examiner

ASSEMBLED LADDER

CROSS REFERENCES TO THE RELATED APPLICATIONS

This application is based upon and claims priority to Chinese Patent Application No. 201910458609.6, filed on May 29, 2019, the entire contents of which are incorporated herein by reference.

TECHNICAL FIELD

The invention relates to an assembled ladder.

BACKGROUND

Ladders are tools commonly used in daily work. Existing ladders typically include a pair of front supporting legs and a pair of rear supporting legs, wherein rungs are arranged between the two front supporting legs and/or the two rear supporting legs. According to assembled ladders in the prior art, the front supporting legs are rotatably connected to the rear supporting legs, so that the space can be saved after the supporting legs are folded. However, the rungs between the two front supporting legs or/and the two rear supporting legs are non-detachable, and there is still much room that cannot be effectively used between the two front supporting legs and the two rear supporting legs, so that the number of ladders accommodated in the same space is decreased, and the transportation cost is greatly increased and may even exceed the value of the ladders particularly during ocean transportation.

SUMMARY

The objective of the invention is to overcome the defects of the prior art by providing an assembled ladder, which is reasonable in structural design, capable of effectively reducing logistics costs, and easy and fast to assemble.

The technical solution adopted by the invention to fulfill the aforesaid objective is as follows: an assembled ladder comprises two supporting leg assemblies, at least one rung and a bridging part, wherein each supporting leg assembly comprises a front supporting leg and a rear supporting leg rotatably connected to the front supporting leg, and the rung and the bridging part are detachably connected between the two supporting leg assemblies; during logistics transportation, the rung is detached from the supporting leg assemblies, the bridging part is also detached from the supporting leg assemblies, and the two supporting leg assemblies are stacked; and in use, the two ends of the bridging part are fixedly connected to the two supporting leg assemblies, and the two ends of the rung are also fixedly connected to the two supporting leg assemblies.

Wherein, the assembled ladder comprises at least one foot assembly, wherein the foot assembly comprises a foot plate and mounting parts rotatably connected to the foot plate, the mounting parts are detachably connected to the supporting leg assemblies, and when the foot plate is unfolded, the rung is located below the foot plate to support the foot plate; during logistics transportation, the foot assembly is detached from the two supporting leg assemblies; and in use, the mounting parts of the foot assembly are fixedly connected to the front supporting legs.

Wherein, the assembled ladder further comprises at least one foot assembly, wherein the foot assembly comprises a foot plate, mounting strips for mounting the foot plate, and mounting parts rotatably connected to the mounting strips, the mounting parts are fixedly connected to the supporting leg assemblies, the foot plate is detachably connected to the mounting strips, and when the foot plate is unfolded, the rung is located below the foot plate to support the foot plate; during logistics transportation, the foot plate is detached from the mounting strips; and in use, the foot plate is fixedly connected to the mounting strips.

Wherein, the assembled ladder further comprises at least one foot assembly, wherein the foot assembly comprises a foot plate which is detachably and rotatably connected to the supporting leg assemblies through fasteners, and when the foot plate is unfolded, the rung is located below the foot plate to support the foot plate; during logistics transportation, the foot plate is detached from the two supporting leg assemblies; and in use, the foot plate is rotatably connected to the front supporting legs.

Wherein, the foot plate comprises an upper foot plate and a lower foot plate, wherein the upper foot plate and the lower foot plate are provided with mounting parts which are rotatably connected to the upper foot plate and the lower foot plate, and the rung is located below the upper foot plate to support the foot plate; first connecting rods are arranged between the upper foot plate and the lower foot plate, the two ends of each first connecting rod are rotatably connected to the upper foot plate and the lower foot plate, respectively; and second connecting rods are arranged between the first connecting rods and the rear supporting legs, and the two ends of each second connecting rod are rotatably connected with one first connecting rod and one rear supporting leg, respectively.

Wherein, the assembled ladder further comprises a connector, wherein the connector comprises two mounting parts, a protrusion is arranged between the two mounting parts and is fixedly connected to the two mounting parts, and cavities allowing the protrusion to be inlaid therein are formed in the two ends of the rung; when the ladder is assembled to be used, the protrusion of the connector is inlaid in the rung, and the mounting parts of the connector are connected to the supporting leg assemblies; during logistics transportation, the connector is detached from the supporting leg assemblies and is also detached from the rung; or the connector is fixedly connected to the supporting leg assemblies and is detached from the rung; or, the connector is fixedly connected to the rung and is detached from the supporting leg assemblies.

Wherein, the connector is a metal material of an integrated structure and adopts an n-shaped protrusion formed by bending a metal sheet, and the two sides of the n-shaped protrusion are bent outwards to form the mounting parts.

Wherein, in use, the side wall of the n-shaped protrusion is fixed to the rung through a fastener.

Wherein, a first mounting hole is formed in the rung, a second mounting hole is formed in the side wall, close to the first mounting hole, of the protrusion, and in use, a fastener is disposed in the first mounting hole and the second mounting hole to fix the rung and the protrusion together.

Wherein, holes are formed in the sides, close to the rung, of the supporting leg assemblies, nuts fixedly connected to the supporting leg assemblies are disposed in the holes, and third mounting holes are formed in the mounting parts; and when the ladder is assembled to be used, screws penetrate through the third mounting holes to be fastened with the nuts to fixedly connect the rung to the supporting leg assemblies.

Wherein, threaded holes are formed in the two ends of the rung, through holes are formed in the front supporting legs and/or the rear supporting legs, and screws penetrate through the through holes to be connected into the threaded holes in a threaded manner, so that the rung is fixedly connected to the front supporting legs and/or the rear supporting legs.

Wherein, the bridging part is provided with a pair of convex inserts, and fourth mounting holes and fifth mounting holes are formed in the outer sides of the front supporting legs; and when the ladder is assembled to be used, the inserts of the bridging part are inserted into the fourth mounting holes of the front supporting legs, and screws penetrate through the fifth mounting holes to be fastened with nuts to fixedly connect the bridging part to the front supporting legs.

Compared with the prior art, the invention has the following advantages and effects: the assembled ladder is particularly suitable for e-commerce logistics; during logistics transportation, main components of the ladder are disassembled, and the ladder has a very small size after being folded, so that the logistics transportation cost is greatly reduced; and after receiving the disassembled ladder, customers can rapidly and easily assemble the ladder, and all the components of the ladder can be assembled easily and reliably.

DETAILED DESCRIPTION OF THE EMBODIMENTS

Figure 1:
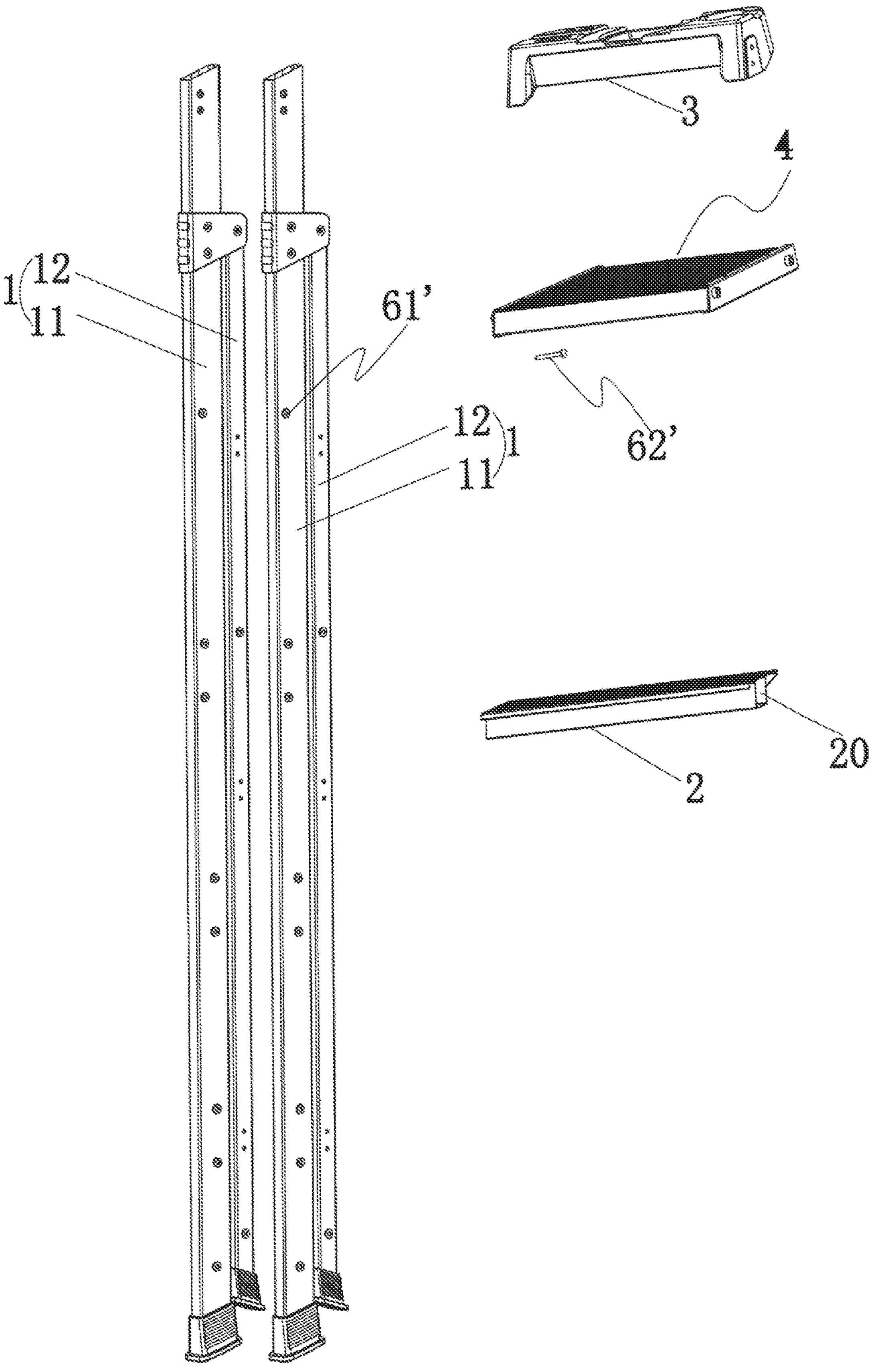
FIG. 1 is a structural diagram of the invention before use.
Figure 2:
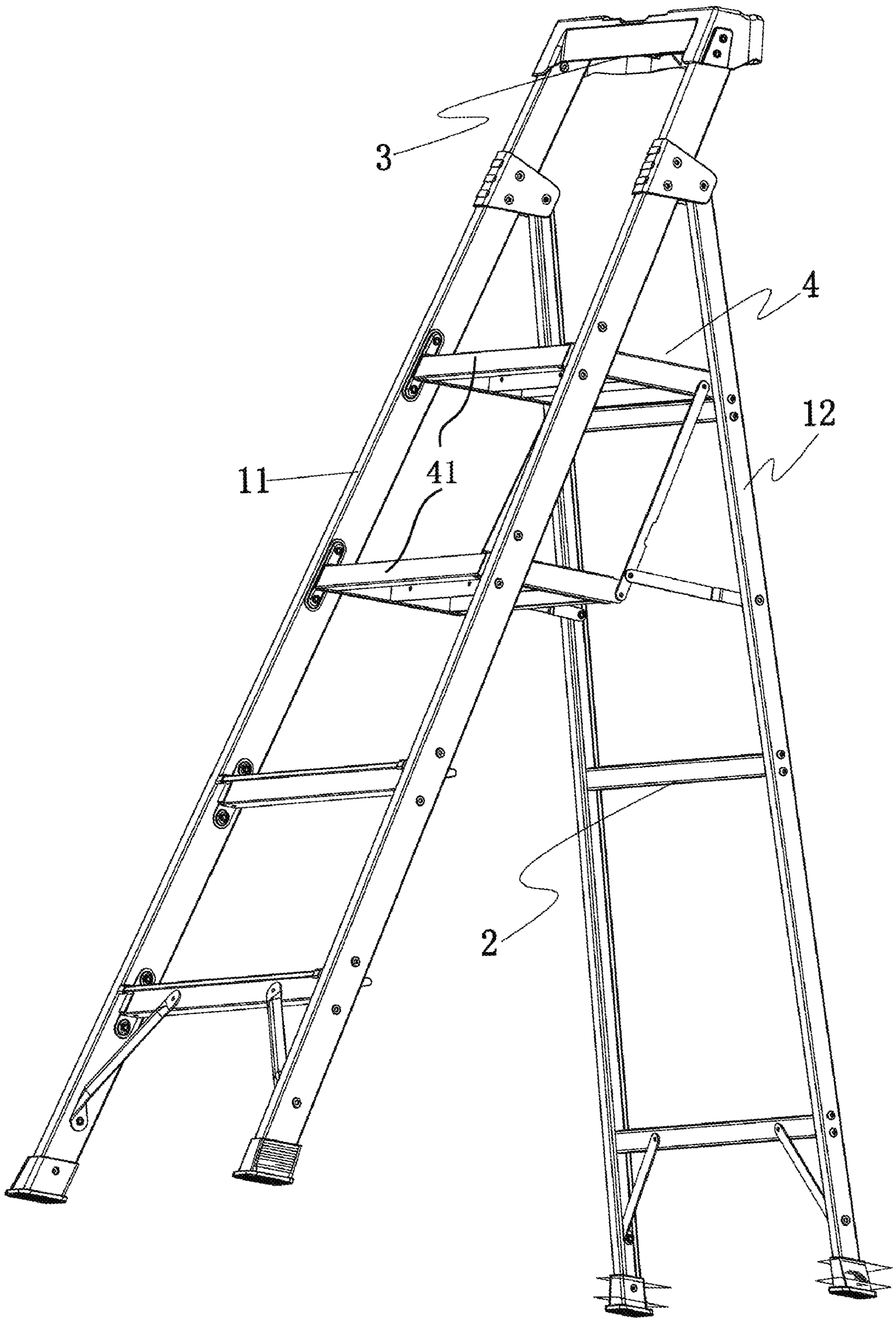
FIG. 2 is a structural diagram of the invention in use.
Figure 3:
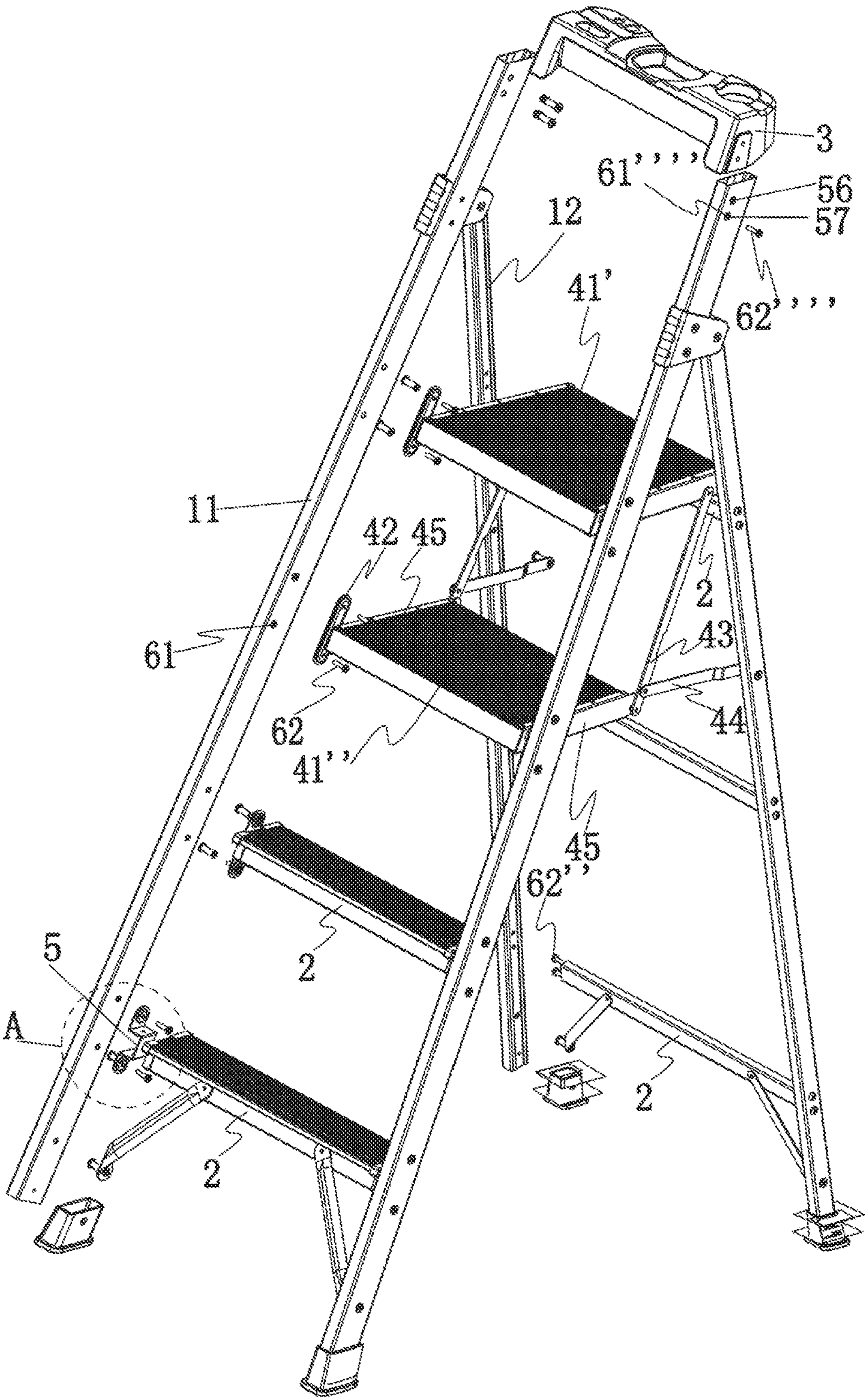
FIG. 3 is an assembly diagram of the invention.
Figure 4:
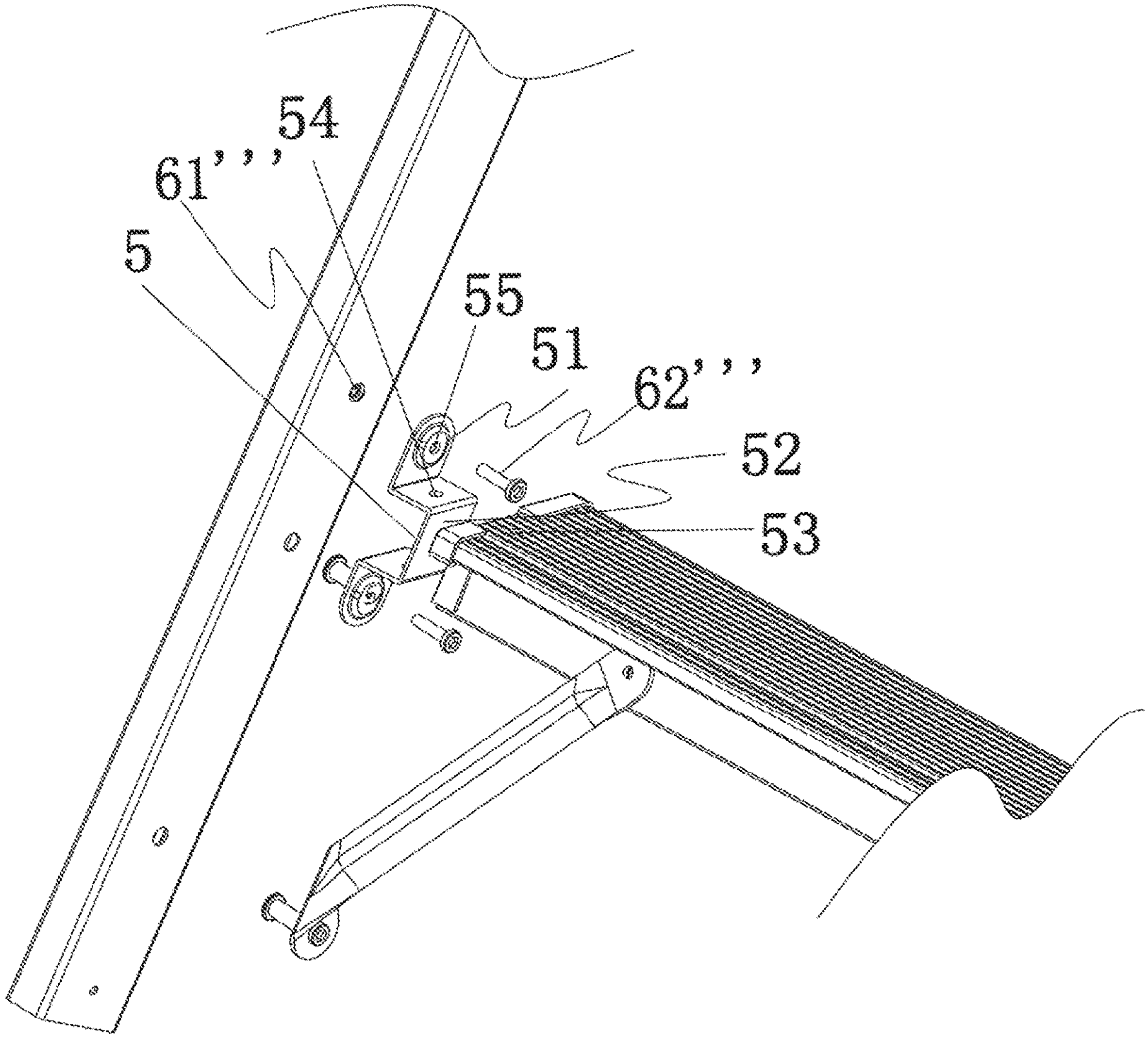
FIG. 4 is an enlarged view of part A in FIG. 3.

The invention is further expounded below in conjunction with the accompanying drawings and embodiments. Clearly, the following embodiments are merely used to explain the invention, and are not intended to limit the invention.

Embodiment

As shown in FIG. 1 to FIG. 4, an assembled ladder comprises two supporting leg assemblies 1, wherein each supporting leg assembly 1 comprises a front supporting leg 11 and a rear supporting leg 12 rotatably connected to the front supporting leg 11. The assembled ladder further comprises rungs 2 and a bridging part 3, wherein the rungs 2 and the bridging part 3 are detachably connected between the two supporting leg assemblies 1. During logistics transportation, the rungs 2 are detached from the supporting leg assemblies 1, the bridging part 3 is also detached from the supporting leg assemblies 1, and the two supporting leg assemblies 1 are stacked. In use, the two ends of the bridging part 3 are fixedly connected to the two supporting leg assemblies 1, and the two ends of each rung 2 are also fixedly connected to the two supporting leg assemblies 1. During logistics transportation, the supporting leg assemblies 1 are disassembled from the rungs 2 and the bridging part 3 and are then stored in a space-efficient manner. Traditional ladders can be folded, but there is still much room that cannot be effectively used between the two supporting leg assemblies 1. When this application is implemented, during logistics transportation, the front supporting legs 11 and the rear supporting legs 12 are drawn together, and then the two supporting leg assemblies 1 are stacked, so that very little room is left between the two supporting leg assemblies 1. After purchasing the ladder, consumers can easily and rapidly assemble the ladder. When the assembled ladder is used, the two ends of the bridging part 3 are fixedly connected to the two supporting leg assemblies 1, and the two ends of each rung 2 are also fixedly connected to the two supporting leg assemblies 1. The user experience of the assembled ladder is basically the same as that of existing ladders.

In this embodiment, the assembled ladder further comprises foot assemblies 4. Each foot assembly 4 comprises a foot plate 41 and mounting parts 42 rotatably connected to the foot plate 41, wherein the mounting parts 42 are detachably connected to the supporting leg assemblies 1, and when the foot plate 41 is unfolded, one rung 2 is located below the foot plate 41 to support the foot plate 41. During logistics transportation, the foot assemblies 4 are detached from the two supporting leg assemblies 1. In use, the mounting parts 42 of the foot assemblies 4 are fixedly connected to the front supporting legs 11.

In this embodiment, the mounting parts 42 are detachably connected to the supporting leg assemblies 1 specifically as follows: nuts 61 are disposed on the supporting leg assemblies 1, and screws 62 penetrate through the mounting parts 42 to be connected to the nuts 61 in a threaded manner, so that the mounting parts 42 are detachably and fixedly connected to the supporting leg assemblies 1. During logistics transportation, the foot assemblies 4 are disassembled from the two supporting leg assemblies 1, and then, the two supporting leg assemblies 1 are stacked. When the assembled ladder is used, the mounting parts 42 of the foot assemblies 4 are fixedly connected to the front supporting legs 11. By adoption of detachable connection, assembly and disassembly are easy and fast.

Furthermore, in the case where the foot plate 41 includes an upper foot plate 41' and a lower foot plate 41", the upper foot plate 41' and the lower foot plate 41" are respectively provided with mounting parts 42, which are rotatably connected to the upper foot plate 41' and the lower foot plate 41" and are detachably connected to the supporting leg assemblies 1, wherein one rung 2 is located below the upper foot plate 41' to support the foot plate 41; first connecting rods 43 are arranged between the upper foot plate 41' and the lower foot plate 41", and the two ends of each first connecting rod 43 are rotatably connected to the upper foot plate 41' and the lower foot plate 41", respectively; and second connecting rods 44 are arranged between the first connecting rods 43 and the rear supporting legs 12, and the two ends of each second connecting rod 44 are rotatably connected to one first connecting rod 43 and one rear supporting leg 12, respectively. In this embodiment, the technical solution adopted for implementing rotatable connection belongs to the prior art, for example, hinge pins, rivets, the screws 62, or other technical means can be adopted to implement rotatable connection.

Or, in this embodiment, the foot assemblies 4 are detachably connected to the supporting leg assemblies 1 specifically as follows: the assembled ladder further comprises the foot assemblies 4; each foot assembly 4 comprises a foot plate 41, mounting strips 45 for mounting the foot plate 41, and mounting parts 42 rotatably connected to the mounting strips 45, wherein the mounting parts 42 are fixedly connected to the supporting leg assemblies 1, the foot plate 41 is detachably connected to the mounting strips 45, and when the foot plate 41 is unfolded, one rung 2 is located below the foot plate 41 to support the foot plate 41; during logistics transportation, the foot plates 41 are detached from the mounting strips 45; and in use, the foot plates 41 are fixedly connected to the mounting strips 45. In this implementation, the foot plates 41 can be assembled on the mounting strips 45 through fasteners such as screws and nuts to realize detachable connection of the foot plates 41 and the mounting strips 45. During logistics transportation, the foot plates 41 are disassembled from the mounting strips 45, and then, the two supporting leg assemblies 1 are stacked. When the assembled ladder is used, the foot plates 41 are fixedly connected to the mounting strips 45. By adoption of detachable connection, assembly and disassembly are easy and fast.

Or, in this embodiment, the foot assemblies 4 are detachably connected to the supporting leg assemblies 1 specifically as follows: the assembled ladder further comprises the foot assemblies 4; each foot assembly 4 comprises a foot plate 41 which is detachably and rotatably connected to the supporting leg assemblies 1 through fasteners, and when the foot plate 41 is unfolded, one rung 2 is located below the foot plate 41 to support the foot plate 41; during logistics transportation, the foot plates 41 are detached from the two supporting leg assemblies 1; and in use, the foot plates 41 are rotatably connected to the front supporting legs 11. In this implementation, the fasteners are screws 62' and nuts 61', wherein the nuts 61' are disposed on the supporting leg assemblies 1, the foot plates 41 are formed with through holes allowing the screws 62' to penetrate through, and the screws 62' penetrate through the through holes and are then connected to the nuts 61' in a threaded manner to detachably and rotatably connect the foot plates 41 to the supporting leg assemblies 1. According to this implementation, the structure is simple; during logistics transportation, the foot plates 41 are disassembled from the supporting leg assemblies 1, and then the two supporting leg assemblies 1 are stacked; and when the assembled ladder is used, the foot plates 41 are rotatably connected to the supporting leg assemblies 1. By adoption of detachable connection, assembly and disassembly are easy and fast.

In this embodiment, the rungs 2 are detachably connected to the supporting leg assemblies 1 by conventional means of the prior art or through the following technical solution which is specifically implemented as follows: threaded holes are formed in the two ends of each rung 2, through holes are formed in the front supporting legs 11 and/or the rear supporting legs 12, and screws 62" penetrate through the through holes to be connected into the threaded holes in a threaded manner, so that the rungs 2 are fixedly connected to the front supporting legs 11 and/or the rear supporting legs 12.

In another implementation, the assembled ladder further comprises connectors 5. Each connector 5 comprises two mounting parts 51, wherein a protrusion 52 is arranged between the two mounting parts 51 and is fixedly connected to the two mounting parts 51. Cavities 20 allowing the protrusions 52 of the connectors 5 to be inlaid therein are formed in the two ends of each rung 2. When the assembled ladder is used, the protrusions 52 of the connectors 5 are inlaid in the rungs 2, and the mounting parts 51 of the connectors 5 are connected to the supporting leg assemblies 1. During logistics transportation, the connectors 5 are detached from the supporting leg assemblies 1 and are also detached from the rungs 2; or, the connectors 5 are fixedly connected to the supporting leg assemblies 1 and are detached from the rungs 2; or, the connectors 5 are fixedly connected to the rungs 2 and are detached from the supporting leg assemblies 1. In this embodiment, the mounting parts 51 and the protrusions 52 are fixed by welding, the protrusions 52 are connected to the rungs 2, and the mounting parts 51 are connected to the supporting leg assemblies 1. The mounting parts 51 are fixed to the supporting leg assemblies 1 with rivets or other fasteners. In this embodiment, the rungs 2 are components having two ends connected to the two front supporting legs 11 or the two rear supporting legs 12. In specific implementations, the rungs may be connecting rods for realizing fixed connection, or foot parts allowing users to step thereon. By adoption of such structure, the supporting leg assemblies 1 will not be destroyed after the rungs 2 are assembled, and thus, the bearing capacity of the supporting leg assemblies 1 will not be compromised.

As a preferred implementation, the connectors 5 are metal materials of an integrated structure and adopt n-shaped protrusions 52 formed by bending metal sheets, and the two sides of each n-shaped protrusion 52 are bent outwards to form the mounting parts 51. The connectors 5 of the integrated structure can be assembled on the rungs 2 easily and reliably and have high strength.

As a preferred implementation, the side walls of the n-shaped protrusions 52 are fixed to the rungs 2 through fasteners.

Preferably, first mounting holes 53 are formed in the rungs 2, and second mounting holes 54 are formed in the side walls, close to the first mounting holes 53, of the protrusions 52. In use, the fasteners are arranged in the first mounting holes 53 and the second mounting holes 54 to fix the rungs 2 and the protrusions 52 together.

Preferably, holes are formed in the sides, close to the rungs 2, of the supporting leg assemblies 1, nuts 61''' fixedly connected to the supporting leg assemblies 1 are disposed in the holes, and third mounting holes 55 are formed in the mounting parts 51. When the ladder is assembled to be used, screws 62''' penetrate through the third mounting holes 55 to be fastened with the nuts 61''' to fixedly connect the rungs 2 to the supporting leg assemblies 1.

Figure 5:
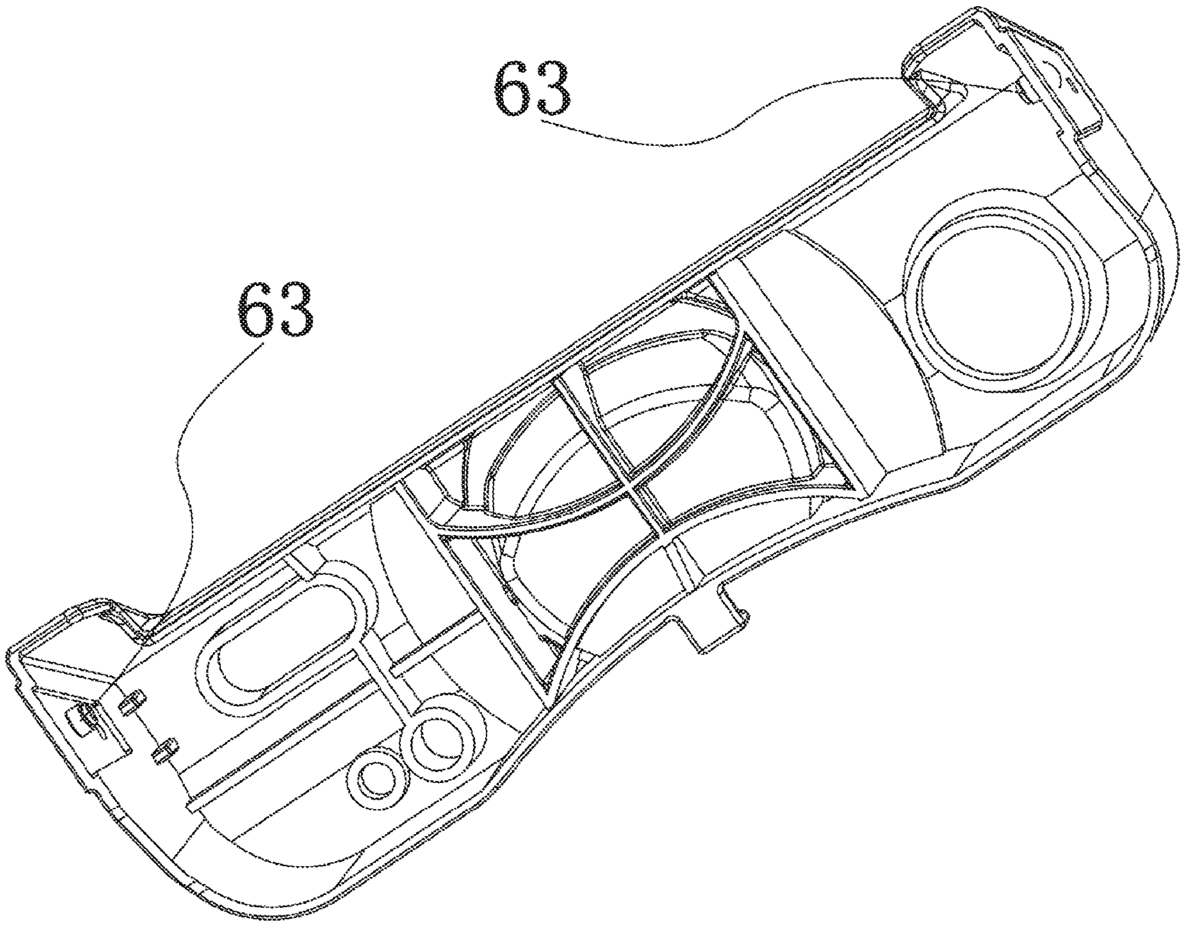
FIG. 5 is a structural diagram of a bridging part with inserts.

In this embodiment, the bridging part 3 is detachably connected to the supporting leg assemblies 1 by conventional means in the prior art or through the following preferred solution: as shown in FIG. 5, the bridging part 3 is provided with a pair of convex inserts 63 and is typically a plastic part; the inserts 63 are directly formed on the bridging part 3 or are assembled on the bridging part 3 later, for example, rivets are driven into the bridging part to form the inserts 63; and fourth mounting holes 56 and fifth mounting holes 57 are formed in the outer sides of the front supporting legs 11.

When the ladder is assembled to be used, the inserts 63 of the bridging part 3 are inserted into the fourth mounting holes 56 of the front supporting legs 11 to realize single-point positioning, and then screws 62"" penetrate through the fifth mounting holes 57 to be fastened with nuts 61"" to fixedly connect the bridging part 3 to the front supporting legs 11, so that two-point positioning of the bridging part 3 is realized, and the bridging part 3 is prevented from turning and can be rapidly assembled on the front supporting legs 11.

In this embodiment, in addition to conventional nuts, the nuts may also be tubular non-standard nuts having threads on the tubular inner walls. Or, the nuts are integrated with the supporting leg assemblies 1, for example, the third mounting holes 55 are tapped to form inner threads, and in this case, the nuts are formed on the supporting leg assemblies 1. In this technical solution, the nuts are combined with the supporting leg assemblies 1 instead of being omitted, and thus, this solution is still within the protection scope of the present application In this embodiment, the nuts, the nuts 61, the nuts 61', the nuts 61", the nuts 61'", the nuts 61"", the screws 62, the screws 62', the screws 62", the screws 62'" and the screws 62"" marked by different reference signs have the same function, and the different reference signs merely indicate different using positions of such components, that is, multiple such components should be mounted at different positions.

The above embodiments in the specification are merely exemplary ones of the invention. Those skilled in the art may make different modifications or supplementations to the specific embodiments described above, or may make similar substitutions without departing from the contents of the specification or going beyond the scope defined by the appended claims, and all these modifications, supplementations or substitutions should also fall within the protection scope of the invention.

What is claimed is:

1. An assembled ladder, comprising a pair of supporting leg assemblies, at least one rung and a bridging part, wherein each supporting leg assembly of the pair of supporting leg assemblies comprises a front supporting leg of a plurality of front supporting legs and a rear supporting leg of a plurality of rear supporting legs rotatably connected to the front supporting leg of the plurality of front supporting legs, the at least one rung and the bridging part being detachably connected between the pair of supporting leg assemblies; the at least one rung being detachable from the pair of supporting leg assemblies, the bridging part being detachable from the pair of supporting leg assemblies, the pair of supporting leg assemblies being capable of being arranged in a stacked relationship when disassembled; and in use, opposite ends of the bridging part being detachably connected to the pair of supporting leg assemblies, opposite ends of the at least one rung being detachably connected to the pair of supporting leg assemblies; each of the opposite ends of the at least one rung provided with a cavity to selectively receive a protrusion provided on a connector detachably secured to each of the pair of supporting leg assemblies; wherein each connector comprises a pair of mounting parts, the protrusion being arranged between the pair of mounting parts and being fixedly connected to the pair of mounting parts, the cavity provided in each of the opposite ends of the at least one rung allows the protrusion to be inlaid in the at least one rung, wherein the bridging part is provided with a pair of convex inserts, and a plurality of fourth mounting holes and a plurality of fifth mounting holes are formed in a plurality of outer sides of the plurality of front supporting legs; and when the assembled ladder is assembled to be used, the pair of convex inserts of the bridging part are inserted into the plurality of fourth mounting holes of the plurality of front supporting legs, and a plurality of screws penetrate through the plurality of fifth mounting holes to be fastened with a plurality of nuts to fixedly connect the bridging part to the plurality of front supporting legs.

2. The assembled ladder according to claim 1, further comprising at least one foot assembly, wherein the at least one foot assembly comprises a foot plate and a plurality of mounting parts rotatably connected to the foot plate, the plurality of mounting parts are detachably connected to the pair of supporting leg assemblies, and when the foot plate is unfolded, the at least one rung is located below the foot plate to support the foot plate; the at least one foot assembly is detached from the pair of supporting leg assemblies; and in use, the plurality of mounting parts of the at least one foot assembly are fixedly connected to the plurality of front supporting legs.

3. The assembled ladder according to claim 1, further comprising at least one foot assembly, wherein the at least one foot assembly comprises a foot plate, a plurality of mounting strips for mounting the foot plate, and a plurality of mounting parts rotatably connected to the plurality of mounting strips, the plurality of mounting parts are fixedly connected to the pair of supporting leg assemblies, the foot plate is detachably connected to the plurality of mounting strips, wherein when the foot plate is unfolded, the at least one rung is located below the foot plate to support the foot plate; the foot plate being detachable from the plurality of mounting strips; and in use, the foot plate is fixedly connected to the plurality of mounting strips.

4. The assembled ladder according to claim 1, further comprising at least one foot assembly, wherein the at least one foot assembly comprises a foot plate detachably and rotatably connected to the pair of supporting leg assemblies through a plurality of fasteners, and when the foot plate is unfolded, the at least one rung is located below the foot plate to support the foot plate; the foot plate being detachable from the pair of supporting leg assemblies; and in use, the foot plate is rotatably connected to the plurality of front supporting legs.

5. The assembled ladder according to claim 2, wherein the foot plate comprises an upper foot plate and a lower foot plate; the upper foot plate and the lower foot plate are provided with the plurality of mounting parts, wherein the plurality of mounting parts are rotatably connected to the upper foot plate and the lower foot plate, and the at least one rung is located below the upper foot plate to support the upper foot plate; a plurality of first connecting rods are arranged between the upper foot plate and the lower foot plate, opposite ends of each first connecting rod of the plurality of first connecting rods are rotatably connected to the upper foot plate and the lower foot plate, respectively; and a plurality of second connecting rods are arranged between the plurality of first connecting rods and the plurality of rear supporting legs, and opposite ends of each second connecting rod of the plurality of second connecting rods are rotatably connected with one first connecting rod of the plurality of first connecting rods and one rear supporting leg of the plurality of supporting legs, respectively.

6. The assembled ladder according to claim 1, wherein when the assembled ladder is assembled to be used, the protrusion provided on each connector is inlaid in the at least one rung, and the pair of mounting parts of the connector are respectively connected to each one of the pair of supporting leg assemblies; each connector being detachable from each one of the pair of supporting leg assemblies and being detachable from the at least one rung.

7. The assembled ladder according to claim 6, wherein each connector provided on each of said front supporting legs being a metal material of an integrated structure and arranged as an n-shaped protrusion of a bent metal sheet, and two sides of the n-shaped protrusion being bent outwards to form the pair of mounting parts.

8. The assembled ladder according to claim 6, wherein in use, a side wall of an n-shaped protrusion is fixed to the at least one rung through a fastener.

9. The assembled ladder according to claim 6, wherein a first mounting hole is formed in the at least one rung, a second mounting hole is formed in a side wall of the protrusion, and in use, a fastener is disposed in the first mounting hole and the second mounting hole to fix the at least one rung and the protrusion together.

10. The assembled ladder according to claim 6, wherein said plurality of screws are a first plurality of screws and said plurality of nuts are a first plurality of nuts, and wherein a plurality of holes are formed in a plurality of sides, of the pair of supporting leg assemblies, a second plurality of nuts fixedly connected to the pair of supporting leg assemblies are disposed in the plurality of holes, and a plurality of third mounting holes are formed in the pair of mounting parts; and when the assembled ladder is assembled to be used, a second plurality of screws penetrate through the plurality of third mounting holes to be fastened with the second plurality of nuts to fixedly connect the at least one rung to the pair of supporting leg assemblies.

11. The assembled ladder according to claim 1, wherein said plurality of screws are a first plurality of screws, and wherein a plurality of threaded holes are formed in the opposite ends of the at least one rung, a plurality of through holes are formed in the plurality of front supporting legs and/or the plurality of rear supporting legs, and a second plurality of screws penetrate through the plurality of through holes to be connected into the plurality of threaded holes in a threaded manner, so that the at least one rung is fixedly connected to the plurality of front supporting legs and/or the plurality of rear supporting legs.

12. The assembled ladder according to claim 7, wherein said plurality of screws are a first plurality of screws and said plurality of nuts are a first plurality of nuts, and wherein a plurality of holes are formed in a plurality of sides of the pair of supporting leg assemblies, a second plurality of nuts fixedly connected to the pair of supporting leg assemblies are disposed in the plurality of holes, and a plurality of third mounting holes are formed in the pair of mounting parts; and when the assembled ladder is assembled to be used, a second plurality of screws penetrate through the plurality of third mounting holes to be fastened with the second plurality of nuts to fixedly connect the at least one rung to the pair of supporting leg assemblies.

13. The assembled ladder according to claim 8, wherein said plurality of screws are a first plurality of screws and said plurality of nuts are a first plurality of nuts, and wherein a plurality of holes are formed in a plurality of sides of the pair of supporting leg assemblies, a second plurality of nuts fixedly connected to the pair of supporting leg assemblies are disposed in the plurality of holes, and a plurality of third mounting holes are formed in the pair of mounting parts; and when the assembled ladder is assembled to be used, a second plurality of screws penetrate through the plurality of third mounting holes to be fastened with the second plurality of nuts to fixedly connect the at least one rung to the pair of supporting leg assemblies.

14. The assembled ladder according to claim 9, wherein said plurality of screws are a first plurality of screws and said plurality of nuts are a first plurality of nuts, and wherein a plurality of holes are formed in a plurality of sides of the pair of supporting leg assemblies, a second plurality of nuts fixedly connected to the pair of supporting leg assemblies are disposed in the plurality of holes, and a plurality of third mounting holes are formed in the pair of mounting parts; and when the assembled ladder is assembled to be used, a second plurality of screws penetrate through the plurality of third mounting holes to be fastened with the second plurality of nuts to fixedly connect the at least one rung to the pair of supporting leg assemblies.

* * * * *